United States Patent [19]

Caye et al.

[11] Patent Number: 4,511,190
[45] Date of Patent: Apr. 16, 1985

[54] KINETIC WHEEL ARRANGEMENT INCORPORATING MAGNETIC BEARINGS, PARTICULARLY FOR STORING ENERGY

[75] Inventors: Paul D. Caye, Epone; Patrice C. Jamain, Maule; Bernard G. Weisser, Limay, all of France

[73] Assignee: Societe Nationale Industrielle Aerospatiale, Paris, France

[21] Appl. No.: 515,150

[22] Filed: Jul. 19, 1983

[30] Foreign Application Priority Data

Aug. 19, 1982 [FR] France ................ 82 14339

[51] Int. Cl.³ ............................................ F16C 39/06
[52] U.S. Cl. .................................. 308/10; 310/51; 310/74; 310/91
[58] Field of Search .............. 308/10; 310/153, 74, 310/90, 157, 91, 51; 248/157, 163 R, 163 A, 160, 161, 560, 562; 244/165, 166

[56] References Cited

U.S. PATENT DOCUMENTS

| | | | |
|---|---|---|---|
| 3,344,676 | 10/1967 | Lautzenhiser et al. | 308/10 |
| 3,747,998 | 7/1973 | Klein | 308/10 |
| 3,955,858 | 5/1976 | Poubeau | 308/10 |
| 4,077,678 | 3/1978 | Studer | 308/10 |
| 4,182,967 | 1/1980 | Jordan | 308/10 |
| 4,211,452 | 7/1980 | Poubeau | 308/10 |

FOREIGN PATENT DOCUMENTS

| | | | |
|---|---|---|---|
| 2129018 | 12/1978 | Fed. Rep. of Germany | 308/10 |
| 7400190 | 8/1975 | France | 308/10 |
| 7440556 | 7/1976 | France | 308/10 |
| 7707685 | 11/1980 | France | 308/10 |
| 8115831 | 2/1983 | France | 308/10 |
| 2511558 | 2/1983 | France | 308/10 |

Primary Examiner—R. M. Skudy
Attorney, Agent, or Firm—Fisher, Christen & Sabol

[57] ABSTRACT

The present invention relates to a kinetic wheel arrangement comprising a stator and a rotor and magnetic bearings for magnetically suspending the rotor with respect to the stator. According to the invention, for the magnetic bearing parts connected to the stator, an elastic suspension system is provided which is rigid in a first direction parallel to the axis of rotation Z-Z of the rotor, rigid in a second direction V-V at right angles to the axis of rotation of the rotor and flexible in a third direction U-U at right angles to the two directions Z-Z and V-V. The invention is more particularly applicable to the accumulation of energy.

7 Claims, 7 Drawing Figures

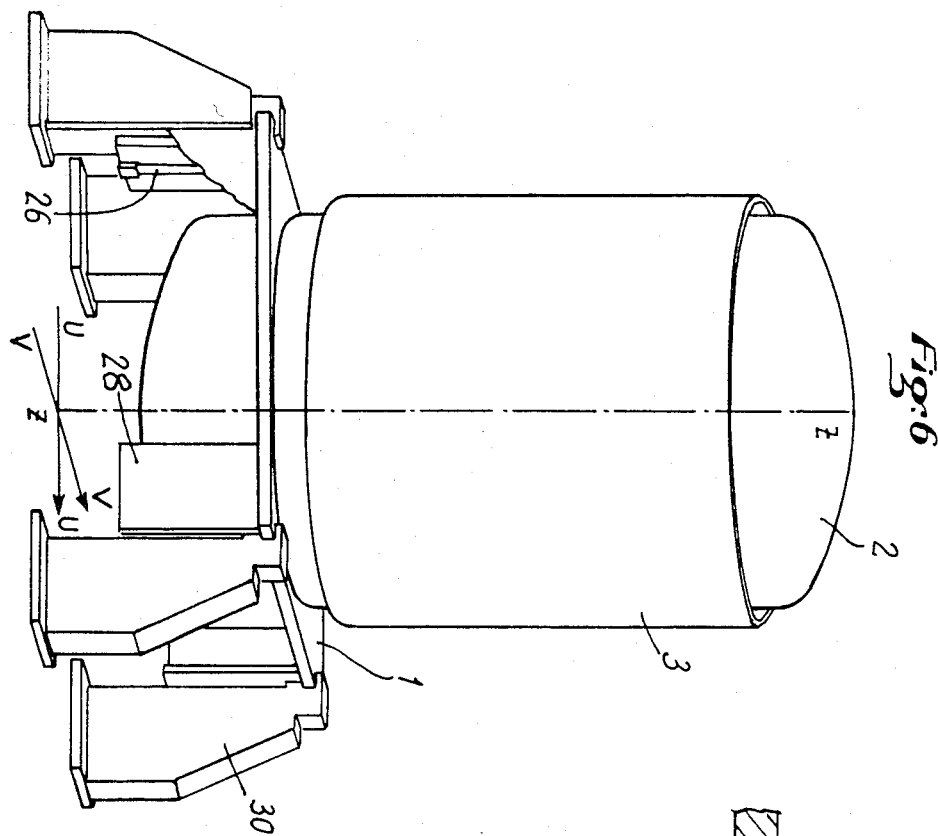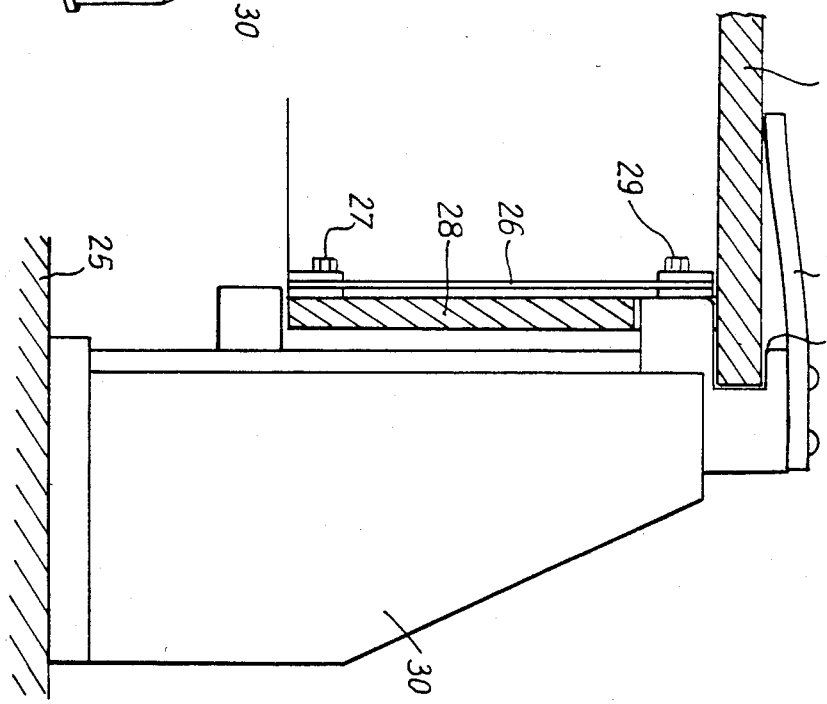

KINETIC WHEEL ARRANGEMENT INCORPORATING MAGNETIC BEARINGS, PARTICULARLY FOR STORING ENERGY

The present invention relates to a kinetic wheel arrangement incorporating magnetic bearings, particularly for storing energy.

In French Pat. Nos. 74 00190, 74 40556, 77 07685 and 81 15831; Applicants have described various kinetic wheel arrangements incorporating magnetic bearings. These prior art arrangements may be used for controlling the attitude of artificial satellites and/or for storing energy either on board such satellites or on the ground.

It is an object of the present invention to provide such a kinetic wheel arrangement intended more particularly, although not exclusively, to serve as energy accumulator on the ground, i.e. comprising a rotor, comprising a flywheel and suspended magnetically with respect to a stator, which accumulates energy in kinetic form when it is driven in rotation by an electric motor and which restores the kinetic energy thus stored in electric form via an electricity generator, said motor and generator possibly being constituted by the same reversible type machine. Operation of such an arrangement advantageously implies that the rotor is in a vacuum, with the result that the stator and rotor are generally contained in an enclosure in vacuum.

With the kinetic wheel arrangements of this type, it is obvious that the kinetic energy stored is greater as the mass and rotation of the flywheel of the rotor are greater. Thus, with a view to using the kinetic wheel arrangements as energy accumulators, it is indispensable to give high values to the mass and speed of rotation of the rotor thereof. Now, although, for arrangements of relatively modest dimensions, the rotation of the rotor does not lead to any difficulty in stability. Applicants have observed that, for large-sized arrangements, phenomena of instability with radial divergance appeared, such phenomena being capable of preventing the arrangements from operating.

To overcome the radial instability of the rotor of such arrangements, active correction means of the type such as described, for a different purpose, in French Pat. No. 81 15831 mentioned above might be used. However, such correction means employ speed sensors and an electronic chain which increase the complexity, cost and mass of the kinetic wheel arrangement and reduce the reliability thereof.

It is therefore an object of the present invention to provide a kinetic wheel arrangement incorporating magnetic bearings, comprising passive means for automatically correcting the phenomena of radial instability of the rotor.

To this end, according to the invention, the kinetic wheel arrangement comprising a stator and a rotor, magnetic bearings formed by cooperating parts respectively connected to the stator and to the rotor to magnetically suspend the rotor with respect to the stator, mechanical bearings to allow the stator to support the rotor when the latter is not magnetically suspended, an inertia flywheel constituting part of the rotor and means for monitoring along the axis of rotation defined by the stator, the position of the rotor with respect to the stator, said stator being connected to a support of high inertia, such as the ground, is noteworthy in that it comprises, for the parts of the magnetic bearings connected to the stator, an elastic suspension system which is rigid in a first direction parallel to the axis of rotation of the rotor, rigid in a second direction at right angles to the axis of rotation of the rotor and flexible in a third direction at right angles to the two preceding directions.

Thanks to the invention, without disturbing the means for monitoring the axial position of the rotor since the suspension system is rigid parallel to this direction, a radial dissymmetry of rigidity in two orthogonal directions is thus introduced, leading to a displacement of the parts of the magnetic bearings connected to the stator with respect to the high-inertia support and enabling the vibrations appearing along the second and third directions to be decoupled.

In an attempt to explain the action of the elastic suspension system according to the invention, it should be recalled that the magnetic bearings are constituted by opposite magnetic rings, exerting on one another an action of self-alignment of their axes and communicating to the rotor its radial rigidity with respect to the stator. Thus, if the ring connected to the rotor is accidentally offset with respect to the ring of the stator, the rotor undergoes a radial return force. The instability with radial divergence can therefore be understood only if phenomena generating a radial parasitic force added to the radial return force of the bearings and of comparable intensity are caused to intervene.

As will be seen hereinafter, Applicants think that, further to magnetic losses, a disturbing force appears, applied to the axis of the rotor and at right angles to the line of shortest distance (offset) joining the axis of the stator to the offset axis of the rotor. Applicants therefore suppose that the rotor is subjected to a first vibratory mode of direction parallel to this disturbing force and to a second vibratory mode of direction parallel to the offset. These two vibratory modes each present their resonance peak at the same frequency and the divergent instability would result from the conjunction of the two resonances.

Consequently, since according to the invention these two vibratory modes are uncoupled, the conjunction of the two resonances and therefore the appearance of the phenomenon of divergent instability may be avoided. Furthermore, since the stator can move more easily (in limited fashion) in said third direction, the rings of the stator may move slightly in this direction under the action of the radial return force, in the sense of self-alignment of the axes of the rings of bearings, to limit and annul the offset of the rotor.

The only purpose of the above explanations is to attempt to explain the manner in which the elastic suspension system according to the invention acts and they in no way limit the invention. Whether these explanations are correct or, on the contrary, inexact or incomplete, the conclusions to be drawn therefrom are in any case exact, since experience has shown that the suspension system according to the invention enables the phenomenon of divergent instability to be eliminated.

The positive results obtained by carrying out the present invention indicate that the divergent instability, appearing when the return force of the magnetic bearings presents a symmetry of revolution about the axis of said bearings, is not produced when, due to the presence of the suspension system according to the invention, this return force is rendered variable about said axis to take different values along two orthogonal radial axes.

Although said suspension system may be intercalated at any point of the mechanical chain linking the rings of bearings of the stator to the high-inertia support, for reasons of simplicity, it is advantageous if the parts of magnetic bearings connected to the stator are fast therewith, whilst the elastic suspension system is disposed between the high-inertia support and the stator. In this way, it is not only the parts of magnetic bearings connected to the rotor which possess a degree of freedom parallel to said third direction, but the whole of the stator. It will be noted that this solution is particularly advantageous since it enables kinetic wheel arrangements made earlier to be improved according to the invention, without internal modifications thereto.

When the kinetic wheel arrangement comprises, in known manner, an envelope which contains the stator and the rotor and in which it is possible to create a vacuum, this arrangement preferably comprises a base plate bearing the stator (and therefore the rotor) and projecting out of the envelope. In this way, the suspension system may be disposed between the part of the plate projecting outside the envelope and said high-inertia support.

The suspension system may be constituted in any known manner in order to obtain the result and may be composed of known elastic elements of all types. However, for purposes of simplicity, said suspension system is preferably formed by a plurality of elastic blades disposed parallel to one another, so that the length, the width and the thickness of said elastic blades are respectively parallel to the first, second and third directions.

The elastic blades of the suspension system may be in compression and/or in traction, but are advantageously in traction. Thus, in a preferred embodiment, the suspension system comprises a plurality of bases distributed on the periphery of the part of the plate projecting outside the envelope and provided in their upper part with means for guiding the edge of said plate, the connection between the plate and each base being made by an elastic blade fast in its upper part with said base and in its lower part with an extension fast with said plate.

It may be advantageous to provide a certain damping of the movement of the bearing parts connected to the stator. Such a damping may be procured by an elastic blade exerting a determined pressure of friction on a mobile part of the mechanical chain connecting the rings of the stator to the high-inertia support, for example the support plate mentioned above.

The invention will be more readily understood on reading the following description with reference to the accompanying drawings, in which.

Figure 1:
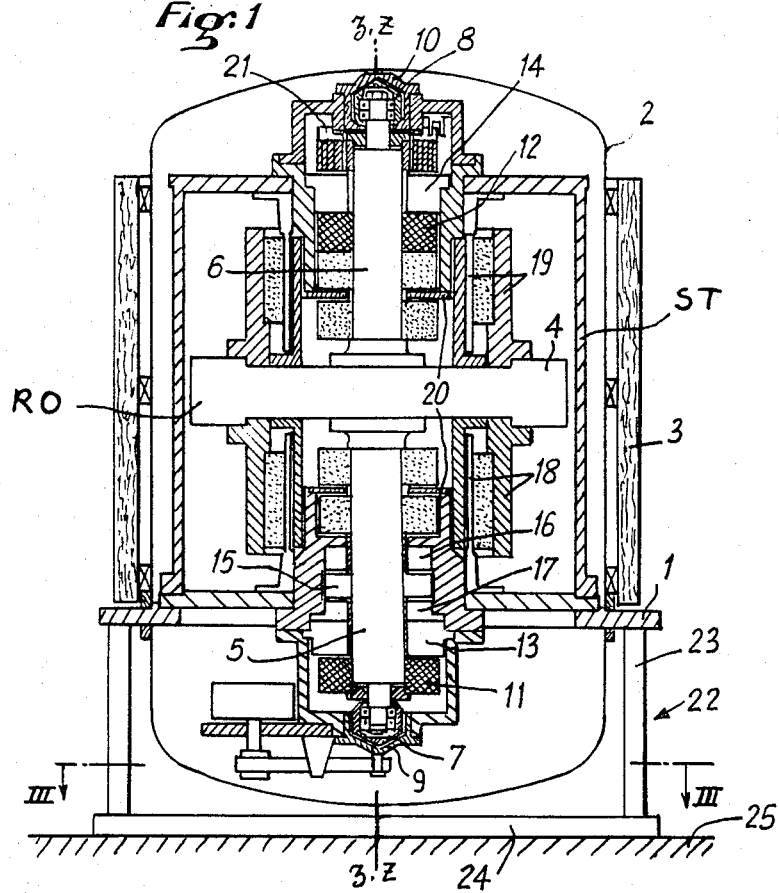
FIG. 1 is a view in axial section of an embodiment of the kinetic wheel incorporating magnetic bearings according to the invention.
Figure 4:
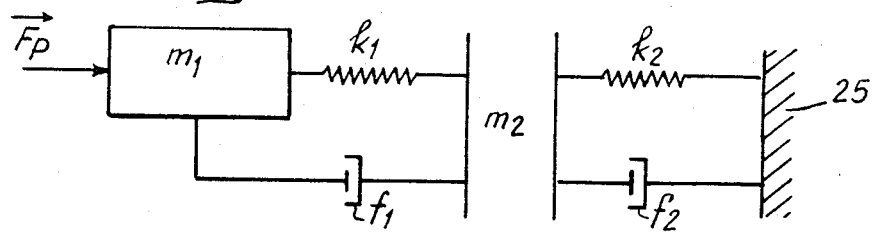

FIG. 4 gives the equivalent radial diagram of the kinetic wheel of FIG. 1.

Figure 5:
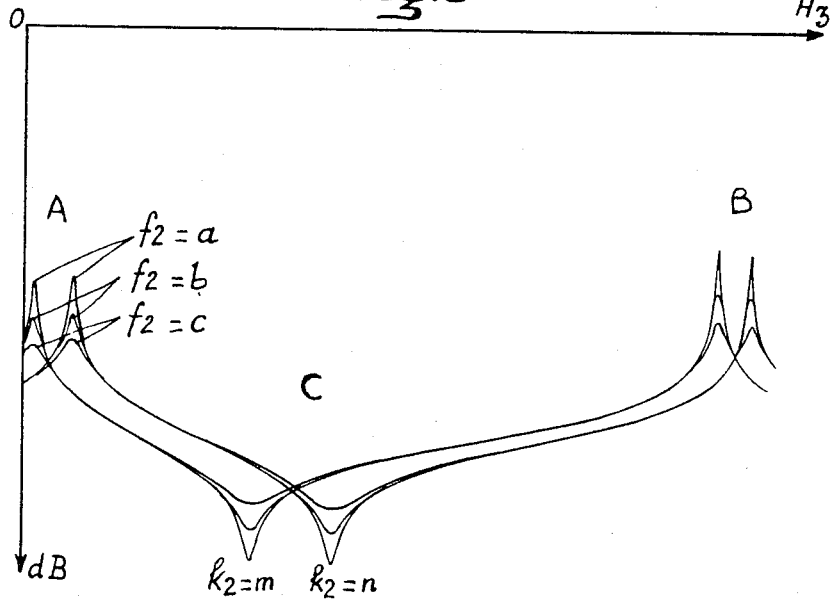

FIG. 5 gives the radial transfer function of the model of FIG. 4.

FIG. 6 is a view in perspective of a variant embodiment of the kinetic wheel according to the invention.

FIG. 7 shows, to a larger scale, a detail of the suspension of the kinetic wheel of FIG. 4.

In these Figures, identical references denote like elements.

Referring now to the drawings, the embodiment of the kinetic wheel arrangement incorporating magnetic bearings, according to the invention and shown in FIG. 1, comprises a horizontal base plate 1 with which all the fixed elements of the stator ST of said wheel are directly or indirectly fast, and with respect to which the rotor RO of said wheel rotates.

In the embodiment shown, the axis of rotation Z—Z of the rotor RO is vertical. Said rotor and stator are enclosed in a tight envelope 2 in which a vacuum sufficient for correct operation of the kinetic wheel may be created, the envelope 2 being supported by the base plate 1. Furthermore, a cylindrical screen 3, laterally enveloping the envelope 2 and adapted to protect the environment against possible explosion of the rotor is provided outside the envelope 2.

The structure of the kinetic wheel of FIG. 1, which is for a large part known, will not be described in detail, but only insofar as this structure is necessary for understanding the present invention.

The rotor RO of the kinetic wheel comprises an inertia flywheel 4, substantially in disc form, fast with a lower shaft 5 and an upper shaft 6, which are coaxial (axis z—z) and at right angles to the plane of said flywheel. At the free ends of shafts 5 and 6 are provided stop systems 7 and 8 incorporating mechanical roller bearings, adapted to cooperate with corresponding fixed parts 9 and 10 of the stator, to support the rotor in stop position and to serve as axial and radial deviation limiter. In this manner the mechanical bearings allow the stator to support the rotor in a direction parallel to a plane of the rotor and at least one mechanical bearing or stop system supports the rotor in a direction perpendicular to the plane of the rotor when the rotor is not suspended magnetically.

Shafts 5 and 6 are each fast with a magnetic bearing ring 11 or 12, which cooperate respectively with rings 13 and 14 of the stator, to form magnetic bearings 11-13 and 12-14.

The kinetic wheel further comprises an actuator for adjusting the axial position of the rotor with respect to the stator. This actuator comprises an annular part 15 fast in rotation with the shaft 5 (or 6) and two fixed annular parts 16 and 17, disposed on either side of the annular part 15.

In addition, the kinetic wheel of FIG. 1 comprises a drive assembly 18 for driving the rotor in rotation and a generator assembly 19 for the accumlation and restoring in electric form the kinetic energy of rotation stored by said rotor. Of course, the drive assembly 18 and the generator assembly 19 may possibly be constituted by a single reversible electric machine.

Experience has shown that, for relatively light rotors, for example of which the mass of the flywheel 4 is less than a few kilograms, no phenomenon of instability capable of influencing the axis of said rotor appears, this virtually whatever the speed of the rotor within its speed range (for example from 0 to 15,000 rpm). In this case, during rotation of the rotor, the axis z—z thereof is constantly merged with axis Z—Z of rotation defined by the bearings of the stator.

On the other hand, when the speed of rotation of the rotor RO becomes high (for example ≧20,000 rpm) and/or when the mass of the flywheel 4 becomes equal to a few tens or hundreds of kilograms, particularly with a view to using the kinetic wheel as kinetic energy accumulator, the appearance of such a phenomenon of instability affecting the axis of said rotor RO is observed.

This unstable behaviour appears only beyond a limited speed of rotation which, however, is generally much less than the maximum speed provided for the rotor.

For example, instability appears at 1500 rpm for a rotor of which the maximum speed is 12,000 rpm and of which the mass of the flywheel 4 is 200 kg.

The phenomenon of instability is characterized in that the axis of rotation z—z of the rotor, whilst remaining parallel to the magnetic axis Z—Z defined by the bearings of the stator, moves away from this axis Z—Z describing a divergent spiral, up to contact of the stop systems 7 and 8 of the rotor with the corresponding fixed parts 9 and 10 of the stator.

It has been observed that:

the frequency at which axis z—z describes the spiral is close or equal to the frequency at which the rotor oscillates when it is moved away radially from its position of equilibrium;

the radial divergence of the rotor is all the more rapid as the speed of rotation thereof is high;

the divergent spiral movement of axis z—z of the rotor is established in the same direction as the rotation of said rotor.

Applicants believe that the explanation of this phenomenon of instability may be found, without this limiting the invention, in the action of magnetic losses (or even aerodynamic losses if the vacuum inside the envelope 2 is not sufficiently good) generated by the relative movement of magnetized pieces and electrically conductive pieces. In particular, whatever care is taken in the manufacture and relative positioning of the magnetic rings 11-13, 12-14 and 15-16-17, certain defects in radial magnetic homogeneity cannot be prevented, which bring about electromagnetic losses, themselves giving rise to disturbing forces which provoke the spiral divergence of the rotor. According to this hypothesis, the rotor would thus diverge under the action of a force of electromagnetic origin developing in particular in the magnetic bearings 11-13 and 12-14 and in the actuator 15-16-17.

As far as it can be assumed and observed, the characteristics of this disturbing force would be:

its amplitude $F_p$ is proportional to the speed of rotation $\Omega$ of the rotor and to the offset e of the rotor, i.e. to the distance separating the axis z—z from axis Z—Z; $F_p = \lambda.\Omega.e$ may thus be written.

The factor of proportionality $\lambda$ is variable from one kinetic wheel model to the other and depends on the mechanical clearances, on the verticality of axis Z—Z, but is a characteristic of the corresponding kinetic wheel.

its direction is orthogonal to that of the offset of the rotor with respect to the stator;

its direction is determined by the direction of rotation of the rotor.

Figure 2:
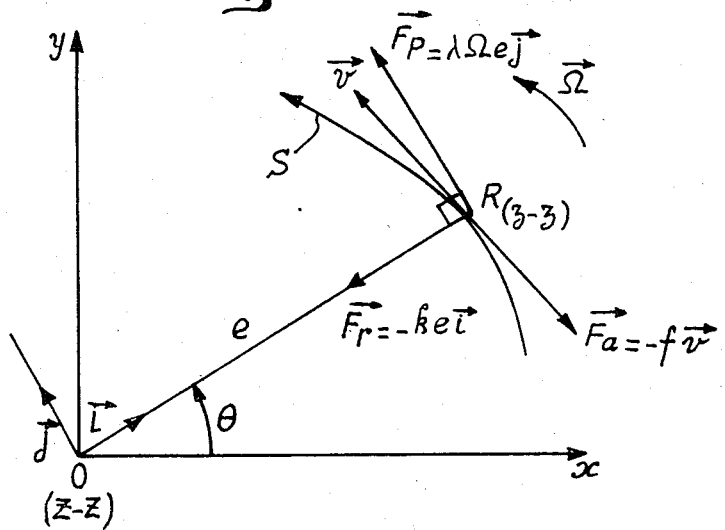
FIG. 2 is a diagram illustrating the phenomenon of instability affecting the axis of the rotor of the kinetic wheel of FIG. 1, under certain conditions of mass and speed of rotation of said rotor.

FIG. 2 shows a system of rectangular axes ox, oy, of which the origin O is located on axis Z—Z, the plane xoy being orthogonal to axis Z—Z. At a given instant, axis z—z of the rotor is offset from axis Z—Z by the quantity e and is located at R in the portion of spiral S, which it covers at velocity v. This axis z—z is subjected to the action of the disturbing force $\vec{F_p}$ which is opposed by the damping force $\vec{F_a}$ of the rotation of the rotor. The force $\vec{F_p}$ is, as mentioned above, orthogonal to OR and in the same direction as $\Omega$. The force $\vec{F_a}$ is colinear to the velocity vector $\vec{v}$, but of opposite direction. Moreover, axis x—x is subjected to the action of the return force $\vec{F_r}$ exerted by the magnetic bearings 11-13 and 12-14 and of which the amplitude is proportional to the offset e.

By calling $\theta$ the angle between the vectors $\vec{Ox}$ and $\vec{OR}$, $\vec{i}$, the director vector of $\vec{OR}$ and $\vec{j}$, the director vector of $\vec{F_p}$, the following may be written:

$$F_p = \lambda.\Omega.e\,j$$

$\vec{F_a} = -f\vec{v}$, f being constant and corresponding to the coefficient of friction applied to the rotor, $\vec{F_r} = -ke\,\vec{i}$, k being constant and indicative of the radial rigidity of the magnetic bearings.

From this system of forces, the equations of the movement of the rotor may be written, employing the mass m of the rotor, said equations being:

$$m\ddot{x} = k\,e\cos(\theta + \pi) + \lambda\Omega\,e\cos\left(\theta + \frac{\pi}{2}\right) - f\dot{x}$$

$$m\ddot{y} = k\,e\sin(\theta + \pi) + \lambda\Omega\,e\sin\left(\theta + \frac{\pi}{2}\right) - f\dot{y}$$

i.e.

$m\ddot{x} = -ke\cos\theta - \lambda\Omega e\sin\theta - f\dot{x}$
$m\ddot{y} = -ke\sin\theta + \lambda\Omega e\cos\theta - f\dot{y}$ Taking into account the fact that $x = e\cos\theta$ and $y = e\sin\theta$, the following system is obtained:

$$m\ddot{x} + f\dot{x} + kx = -\lambda\Omega y$$

$$m\ddot{y} + f\dot{y} + ky = \lambda\Omega x$$

The resolution of this system of differential equations, with application of the ROUTH criterion, shows that the rotation of the rotor is stable if:

$$f > \frac{\lambda\Omega}{\omega} \text{ with } \omega_T\sqrt{\frac{k}{m}} \qquad (1)$$

Inequality (1) shows that, for a given kinetic wheel (i.e. for a determined value of $\lambda$), the stability of rotation of the rotor at a given speed $\Omega$ can be ensured only by increasing the parameter f and/or the parameter $\omega_T$.

Increasing the parameter f consists in equipping the kinetic wheel with an active or passive radial damper. Such a damper must generally multiply the natural damping by at least 10 to obtain stability. This results in that, in its passive form, i.e. constituted by permanent magnets, such a damper requires many magnets and is therefore voluminous. Experimental trials have shown an improvement consecutive to the implantation of such a passive damper; however, this improvement is obtained to the detriment of the mass of the whole and, moreover, due to the manufacturing dispersions, the passive damper must be adjusted for each of the kinetic wheels.

In the case of an active damper, at least one radial actuator 20 is provided (cf. FIG. 1), associated with a sensor 21 and generating a damping force as a function of the measurement of the radial velocity of the rotor given by the sensor 21. Such an active damper, described in French Pat. No. 81 15831 mentioned above, is entirely satisfactory. However, it presents the drawback of requiring at least one servo control system increasing the cost of the kinetic wheel. Moreover, in the event of breakdown of said servo system, the spiral divergence of the rotor is no longer controlled.

It will be noted that the criterion $\omega_T$ corresponds to the pulsation of radial translation. If it is envisaged (as indicated above) to increase this pulsation by a factor of 10, the ratio $k/m$, i.e. the radial rigidity k, must be multiplied by 100, which is unacceptable. Furthermore, the increase in the rigidity of the bearings, i.e. in their efficiency, would be translated by an increase in the tendency of the rotating rotor to diverge, since the losses by eddy currents would increase in the magnetic bearings.

Consequently, the main object of the invention is to solve the problem of the spiral divergence of the rotor by a channel other than the two possibilities described above.

To this end, according to the invention, an elastic suspension system of anisotropic characteristic and at appropriate natural frequency, is provided between the stator (or a part of the stator) of the kinetic wheel and a fixed high-inertia support.

In other words, the stator is no longer directly connected to a fixed point, for example the ground.

In the embodiment of the invention, shown in FIG. 1, this elastic system bears reference numeral 22 and is constituted by elastic blades 23 supporting the kinetic wheel and fast by one of their ends with plate 1 and by their other end with a base support 24 fast with high-inertia support or the ground 25.

Figure 3:
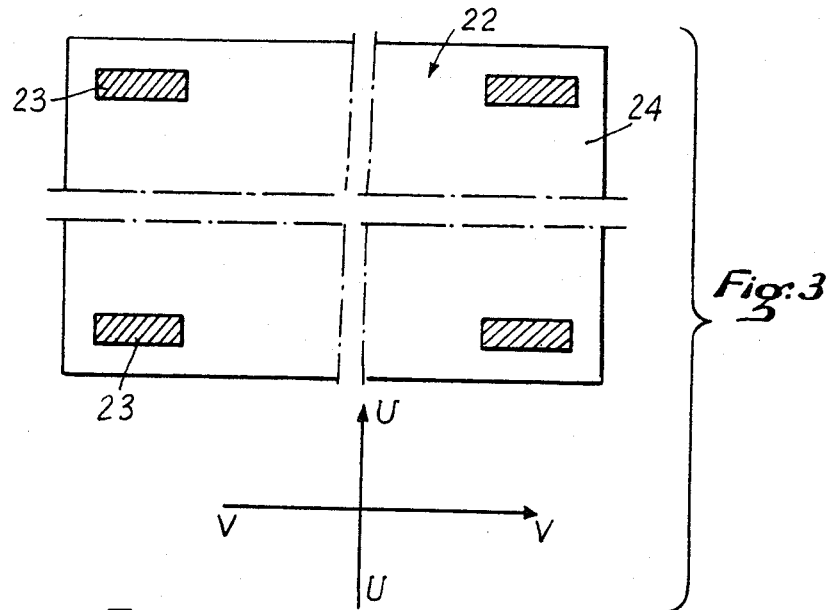
FIG. 3 is a section along line III—III of FIG. 1.

As shown in FIG. 3, the elastic system 22 comprises four elastic blades 23 parallel to one another and to axis Z—Z, so that the small sides of said blades are all parallel to a direction U—U and the large sides thereof are all parallel to a direction V—V at right angles thereto.

Thus, in direction U—U, the elastic system 22 is much less rigid than in directions V—V and Z—Z. Elastic system 22 therefore presents an anisotropy of radial rigidity about axis Z—Z.

FIG. 4 shows the physical diagram equivalent to the kinetic wheel arrangement of FIG. 1. The rotor RO of mass $m_1$, subjected to the disturbing force $\vec{F_p}$, is connected to the stator of mass $m_2$ by a system of rigidity $k_1$ and of damping coefficient $f_1$ ($k_1$ and $f_1$ being due to the magnetic bearings 11-13 and 12-14), whilst the stator is connected to the ground 25 by the elastic system 22, of rigidity $k_2$ and of damping coefficient $f_2$.

The gist of the present invention consists in no longer considering the supports of the bearings of the stator as being fixed with respect to the ground. On the contrary, these bearing supports possess a certain rigidity and damping with respect to a rigid assembly (the ground).

The equation of the model according to FIG. 4 is easily found and the transfer function may be determined therefrom without difficulty. It will be noted that, for a special kinetic wheel arrangement, the parameters $m_1$, $m_2$, $f_1$ and $k_1$ are determined, whilst parameters $f_2$ and $k_2$ must be optimalized in order to obtain the best possible action of the elastic elastic system 22.

FIG. 5 shows, in a frequency-amplitude diagram (in Hz and dB respectively), the transfer function of a kinetic wheel arrangement according to the invention for which the following was had:

| $m_1$ = 215 kg | $m_2$ = 218 kg |
|---|---|
| $k_1$ = 255.10$^{-3}$ N/m | $f_1$ = 50 N/m/s |

This transfer function was plotted for two values of $k_2$ (m=200.10$^{-3}$ N/m and n=258.10$^{-3}$ N/m) and for three values of $f_2$ (a=50 N/m/s, b=200 N/m/s and c=500 N/m/s). The parameter $k_2$ was chosen so that the natural vibratory mode of the stator is close to the vibratory mode of translation of the rotor.

FIG. 5 shows that, for all these values, the transfer function presents two pulsations of resonance A and B decoupled from the actual pulsation of the rotor C at which an anti-resonance is obtained.

In the variant embodiment shown in FIGS. 6 and 7, an elastic system 22 is provided, incorporating elastic blades 26 which, instead of being in a first condition of compression like the blades 23 of FIG. 1, are in a second condition of traction.

To this end, the kinetic wheel is fast by its lower part with a plurality of blades 26, all parallel to one another. For this purpose, the blades 26 are fast at 27 in their lower part, with squares 28 fast with the plate 1 and extending the latter downwardly. In their upper part, the blades 26 are fast at 29 with bases 30, anchored rigidly to the ground 25 and distributed on the periphery of plate 1.

The edges of the plate 1 are engaged in notches 31 provided in the bases 30, guiding said edges whilst allowing the plate 1 a certain clearance in direction U—U.

To communicate a certain damping to the movement of plate 1, i.e. of the whole of the stator with respect to the bases 30, a friction device 32 may possibly be provided. This device may take the form of a prestressed elastic blade (or one with adjustable pressure) abutting on the bases 30 and in abutment against plate 1.

Although FIGS. 1 and 6 respectively illustrate embodiments of the invention in which the elastic blades are in compression and in traction, it goes without saying that an arrangement according to the invention might selectivity comprise elastic blades in a third condition of compression and elastic blades in traction.

What is claimed is:

1. Kinetic wheel arrangement comprising:
   a stator,
   a rotor rotating about an axis of rotation Z—Z, defined by said stator,
   magnetic bearings formed by cooperating parts respectively connected to the stator and to the rotor in order magnetically to suspend the rotor with respect to the stator,
   a suspension system connecting said stator to a high-inertia suport, and wherein said suspension system includes a plurality of elastic blades disposed parallel to one another so that the length, the width, and the thickness of said elastic blades are respectively parallel to a first direction parallel to the axis of rotation Z—Z of the rotor, a second direction V—V the elastic suspension system is disposed between the high-inertia support and the stator, an envelope which encloses the stator and the rotor and base plate which projects outside of said envelope and said suspension system is disposed between a part of the base plate projecting outside of the envelope and said high-inertia support at right angles to the axis or rotation Z—Z of the rotor, and a third direction U—U at right angles to the two preceding directions Z—Z and V—V.

2. The kinetic wheel arrangement of claim 1, for the accumulation and restoring of kinetic energy stored in said rotor having a drive assembly and a generator assembly for driving the rotor, wherein the high-inertia support is the ground, the first direction Z—Z is vertical and the second and third directions form a horizontal plane.

3. The kinetic wheel arrangement of claim 1, wherein the elastic blades are selectively in a first condition of compression, in a second condition of the traction, and third condition of both compression and traction.

4. The kinetic wheel arrangement of claim 1, wherein said elastic blades are fast with at least certain of said bases.

5. The kinetic wheel arrangement of claim 1, wherein at least one of said elastic blades is a means for damping the movement of said stator in a direction of U—U.

6. The kinetic wheel arrangement of claim 5, wherein said means for damping is by friction of at least one of said elastic blades on said base plate.

7. Kinetic wheel arrangement, comprising a stator and a rotor, magnetic bearings formed by cooperating parts respectively connected to the stator and to the rotor in order magnetically to suspend the rotor with respect to the stator, mechanical bearings to allow the stator to support the rotor in a direction parallel to a plane of the rotor and at least one stop system to support the rotor in a direction perpendicular to the plane of the rotor when the rotor is not suspended, magnetically, an inertia flywheel constituting a part of the rotor, and means for monitoring along the axis of rotation Z—Z defined by the stator, the axial position of the rotor with respect to the stator, said stator being connected to a high-inertia support, wherein said kinetic wheel arrangement comprises, for the magnetic bearing parts connected to the stator, an elastic suspension system which is rigid in a first direction parallel to the axis of rotation Z—Z of the rotor, rigid in a second direction V—V at right angles to the axis of rotation of the rotor and flexible in a third direction U—U at right angles to the two preceding directions Z—Z and V—V and wherein the suspension system comprises a plurality of elastic blades disposed parallel to one another so that the length, width and thickness of said elastic blades are respectively parallel to the first (Z—Z), second (V—V) and third (U—U) directions the elastic blades are selectively in a first condition of compression, in a second condition of traction, and a third condition of both compression and traction and the suspression system includes a plurality of bases distrinbuted on the periphery of part of a base plate projecting outside an envelope which encloses the stator and the rotor.

* * * * *